US012084979B2

(12) United States Patent
Rauschmeier

(10) Patent No.: US 12,084,979 B2
(45) Date of Patent: Sep. 10, 2024

(54) GUIDE VANE DEVICE, MOUNTING TOOL, AS WELL AS TURBOMACHINE AND METHOD FOR MOUNTING AND DISMANTLING THE GUIDE VANE DEVICE

(71) Applicant: MTU Aero Engines AG, Munich (DE)

(72) Inventor: Alexander Rauschmeier, Soechtenau (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/326,782

(22) Filed: May 31, 2023

(65) Prior Publication Data

US 2023/0392513 A1 Dec. 7, 2023

(30) Foreign Application Priority Data

Jun. 3, 2022 (DE) ..................... 10 2022 114 072.5

(51) Int. Cl.
*F01D 17/16* (2006.01)

(52) U.S. Cl.
CPC .......... *F01D 17/16* (2013.01); *F05D 2230/60* (2013.01); *F05D 2230/70* (2013.01)

(58) Field of Classification Search
CPC .......... F01D 17/16; F01D 9/042; F01D 5/147; F05D 2230/60; F05D 2230/70; F05D 2230/64; F05D 2220/32; F05D 2220/40; F05D 2220/323; F05D 2240/12; F02C 6/12; F02C 7/36; F02C 7/20; F02B 37/22; F02B 37/24; F02B 39/00; F04D 29/542; F04D 29/324; F05B 2240/12; F05B 2220/40; F05B 2230/60; F23R 3/60; F23R 2900/00017; B64D 27/12; B64D 27/26;
(Continued)

(56) References Cited

U.S. PATENT DOCUMENTS 5,492,446 A 2/1996 Hawkins
8,147,187 B2 4/2012 Foucher
(Continued)

FOREIGN PATENT DOCUMENTS

DE 19537784 A1 6/1996
DE 102017222209 A1 6/2019
(Continued)

OTHER PUBLICATIONS

Ruhlamat, Contract Manufacturing with a High Level of Vertical Integrationhttps://www.ruhlamat.com/en/wiki/shrink-on-joining-technique, 2021, Gerstungen, Germany.

*Primary Examiner* — Mark A Laurenzi
*Assistant Examiner* — Dapinder Singh
(74) *Attorney, Agent, or Firm* — Hinckley, Allen & Snyder, LLP; David R. Josephs

(57) ABSTRACT

The invention is directed to a guide vane device for a guide vane adjustment of a turbomachine, comprising a guide vane, which has a shaft extending along an adjustment axis of the guide vane, as well as an adjusting lever, which forms a connecting element for connection to an outer end of the shaft, wherein, at its outer end, the shaft has a three-dimensional front surface with at least one beveled region, the connecting element surrounds, at least in sections, the outer end of the shaft in a sleeve-like manner and is joined to the outer end in a form-fitting manner, and the guide vane device forms an interference fit between the connecting element and the outer end of the shaft.

9 Claims, 7 Drawing Sheets

(58) Field of Classification Search

Figure 1:
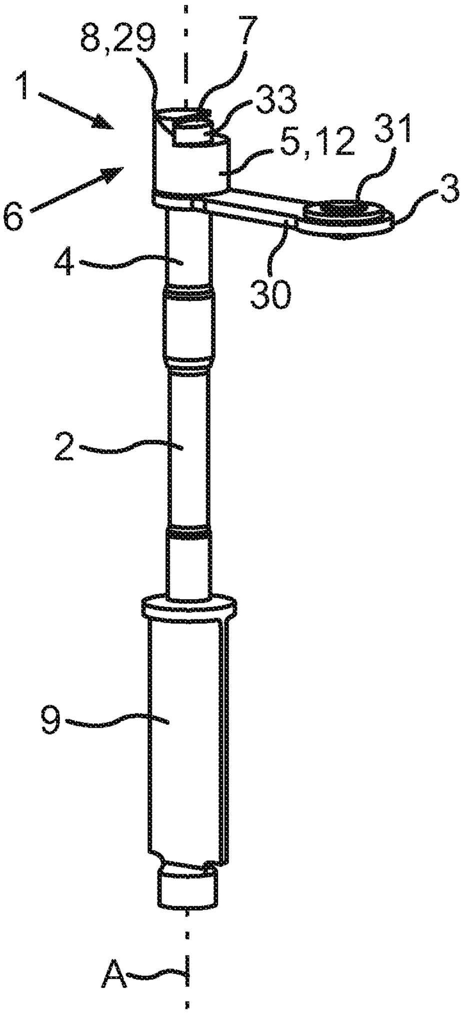

CPC ........... B64D 27/10; B64D 2033/0286; B64D 29/00; B64D 2033/0273; B23P 11/02; B23P 11/025; B23P 19/02; Y10T 29/53396; F16B 4/006

See application file for complete search history.

(56) References Cited

U.S. PATENT DOCUMENTS

| | | | | |
|---|---|---|---|---|
| 9,988,926 | B2 * | 6/2018 | Gasmen | F01D 17/162 |
| 2010/0166540 | A1 | 7/2010 | Perez et al. | |
| 2014/0219785 | A1 | 8/2014 | Gasmen et al. | |
| 2017/0114658 | A1 | 4/2017 | King et al. | |
| 2019/0178096 | A1 * | 6/2019 | Mairhanser | F01D 17/162 |
| 2019/0264574 | A1 * | 8/2019 | Kjelby | F02C 9/20 |

FOREIGN PATENT DOCUMENTS

| | | | |
|---|---|---|---|
| DE | 102018202119 | A1 | 8/2019 |
| EP | 2642088 | A2 | 9/2013 |
| FR | 2793521 | B1 | 9/2005 |
| GB | 2412947 | A | 10/2005 |

* cited by examiner

GUIDE VANE DEVICE, MOUNTING TOOL, AS WELL AS TURBOMACHINE AND METHOD FOR MOUNTING AND DISMANTLING THE GUIDE VANE DEVICE

BACKGROUND OF THE INVENTION

The invention relates to a guide vane device for a guide vane adjustment of a turbomachine, a mounting tool, a method for rotation-resistant mounting of a guide vane with an adjusting lever, a method for dismantling a rotation-resistant mounting of a guide vane device, as well as a turbomachine, in particular an aircraft gas turbine, in accordance with the present invention.

Compressors in axial turbomachines, such as, for example, in aircraft gas turbines, comprise, as a rule, a guide vane adjustment means in the region of the front compressor stages or in the high-pressure compressor. The guide vane adjustment means enables the guide vanes of the relevant guide vane row to be adjusted around their adjustment axis depending on rotational speed, so that an angle of an airfoil of the guide vane can be changed to a flow direction. In this way, it is possible to prevent a stall when the turbomachine is powered up or at low rotational speeds. Accordingly, the load on any one stage is reduced. Alternatively, a stall could also be prevented through an adjustment of the rotating blades of the compressor stages, although this is technically considerably more complicated, so that the adjustment of guide vanes has prevailed.

The adjustment of the guide vanes of a guide vane row takes place conventionally in a mechanical way by operation of an actuator. As a rule, the actuator acts on the guide vanes via an adjustment ring and by means of a respective adjusting lever.

The joining of adjusting levers to the guide vanes is implemented, as a rule, by a screw connection, whereby an outer end of the guide vane shaft has a thread. First of all, a form fit is produced between the adjusting lever and the guide vane and it is then secured by a threaded nut that is screwed onto the thread. In order to be able to ensure an exact adjustment during operation, it is important that under all operating conditions, the adjusting lever is situated in a precisely defined position with respect to the vane airfoil or with respect to the vane airfoil geometry of the guide vane. The connection also should not ease up under maximum loads, such as, for example, during a compressor surge, vibrations, or an increased torque, etc.

The drawback of such a connection is that, owing to the small design size of the shaft of the guide vane, only small shaft diameters and small thread diameters are possible. This leads to relatively complicated geometries and narrow tolerances of the lever and of the guide vane. Furthermore, the threaded nut must be secured by an additional element in order to prevent twisting. A weakening of the vane shaft due to the notch or stress concentration factor of the thread is likewise a drawback.

In addition, the mounting necessitates that, in particular, the threaded nut must be screwed on with a defined torque, and dismantling in the case of a plurality of guide vanes necessitates much time and is therefore especially tedious. Beyond this, threaded nuts entail a certain weight, so that a power-to-weight ratio of the turbomachine is detrimentally increased.

SUMMARY OF THE INVENTION

Accordingly, the object of the invention is to provide a connection between a guide vane and an adjusting lever that overcomes the named drawbacks.

The object is achieved according to the invention by a guide vane device, a mounting tool, a method for mounting, a method for dismantling, as well as a turbomachine in accordance with the present invention. Advantageous embodiments with expedient further developments of the invention are presented below, with advantageous embodiments of each aspect of the invention to be regarded as advantageous embodiments of the respective other aspects of the invention.

A guide vane device for a guide vane adjustment of a turbomachine is provided by the invention. The guide vane device comprises a guide vane, which has a shaft that extends along an adjustment axis of the guide vane, as well as an adjusting lever, which forms a connecting element for connection to an outer end of the shaft. In accordance with the invention, it is provided that

- at its outer end, the shaft has a positioning segment, which is set up to predetermine a defined positioning or direction of installation of the lever on the shaft. Preferably, it is possible for this positioning segment to be designed as a three-dimensional front surface, in particular with at least one beveled region,
- the connecting element surrounds, at least in sections, the outer end of the shaft in a sleeve-like manner and is joined to the outer end in a form-fitting manner,
- the guide vane device forms an interference fit between the connecting element and the outer end of the shaft.

The adjustment axis is, in particular, the axis around which the guide vane and, in particular, the vane airfoil can be adjusted or rotated in an angle of attack to a flow direction of the turbomachine by means of the adjusting lever. The adjustment axis, in particular, can be coaxial to a height axis of the guide vane, in which the guide vane or the shaft of the guide vane essentially extends.

The connecting element is formed, in particular, at a distal end of the adjusting lever. Preferably, the adjusting lever can be one piece in design and can comprise the connecting element as well as a lever arm and a lever connection.

The outer end of the shaft is understood to mean, in particular, the radial outer end of the shaft. The radial outer end is the end of the shaft and, in particular, of the guide vane that faces away from a rotor shaft of the turbomachine. Situated at the radial inner end of the guide vane is the vane airfoil. The outer end can be understood, in particular, to mean not solely a front surface of the shaft, but rather also an end region or end member of the shaft.

A three-dimensional front surface is to be understood, in particular, to mean that the front surface does not extend solely in one plane, but rather that the front surface has areas in different planes, which, in particular, are situated at an angle to one another and/or are offset with respect to one another.

The beveled region is directed, in particular, at an angle to a virtual plane, which is orthogonal to the adjustment axis and which is also referred to below as an orthogonal plane, and/or at an angle to a plane that is directed parallel to the adjustment axis.

The outer end of the shaft is surrounded by the connecting element in a sleeve-like manner. In other words, the connecting element can be essentially sleeve-like in design or hat-like or cap-like in design. This means that the outer end is situated at least in part in the interior of the connecting element and that surfaces of the outer ends are in resting contact, at least in sections, with inner surfaces of the connecting element.

Furthermore, the connecting element is joined to the outer end in a form-fitting manner. In particular, the connecting element can be joined to the beveled region in a form-fitting manner and, in particular, can thereby be connected in a rotation-resistant manner and, in particular, can be connected to the further surfaces of the outer end. The consequence of this is that, in particular, a rotation of the connecting element around the height axis in relation to the shaft is prevented. Furthermore, owing to the form-fitting connection to the beveled region on the front surface, the connecting element can be prevented from slipping in the direction of the radial inner end of the shaft. Accordingly, the connecting element is firmly connected to the shaft along the adjustment axis and in the direction of the radial inner end.

Beyond this, an interference fit, which can also be referred to as a pressed fit, is formed between the connecting element and the outer end of the shaft.

The invention affords numerous advantages. On the one hand, there ensues the advantage that the guide vane is connected effectively to the adjusting lever, so that any movement of the adjusting lever along and around the adjustment axis in relation to the guide vane is prevented. Consequently, a rotation of the adjusting lever around the adjustment axis is reflected in an extremely exact rotation of the guide vane. This is especially advantageous, in particular, for an adjustment of the guide vane by means of the adjusting lever, which has to occur in an extremely precise manner.

Secondly, the invention makes it possible advantageously that, for the linkage of the adjusting lever to the guide vane, no thread, which would weaken the shaft, is required in the shaft. Consequently, it is possible by means of the shaft, to transmit a larger torque or to provide the shaft with a smaller diameter. The smaller dimensioning of the shaft thereby enabled can thus result, in particular, in savings in terms of material, costs, and design space in the turbomachine. Likewise, the threaded nut is also dispensed with by way of the invention, thereby affording additional advantages in terms of cost and weight.

Thirdly, the connection between of the guide vane and the adjusting lever is designed advantageously in an especially simple manner. A mounting and dismantling is thereby easily possible, so that hereby mounting time and thus costs can be saved.

The invention also comprises further developments, through which further advantages ensue.

A further development of the invention provides that the connecting element is a hollow body, which, in its interior, is complementary in form to the outer end of the shaft. In particular, in its interior, the hollow body can have an inner wall surface, which can be complementary in form to the lateral surface of the outer end. In particular, these surfaces are cylindrical in form. Preferably, the hollow body can have a surface that is complementary in form to the beveled region, with this surface and the beveled region being in area contact, so that, in particular, it is possible to create a form fit, which prevents any relative rotation between the guide vane and the adjusting lever around the adjustment axis.

A further development of the invention provides that, in a non-mounted state, an inner diameter of the connecting element is smaller than a diameter of the shaft at the outer end. Preferably, in the non-mounted state, the inner diameter of the connecting element, in particular the largest tolerated size of the inner diameter, is smaller than the diameter of the shaft, in particular a minimum size of the diameter of the end of the shaft that is surrounded in a sleeve-like manner. Through the interference fit, it is ensured that a firm connection between the guide vane and the adjusting lever is produced, so that any movement along and around all spatial axes, in particular along and around the adjustment axis, is prevented. The advantage hereby ensues that an especially firm connection between the adjusting lever and the guide vane is afforded, so that an extremely precise adjustment is possible.

A further development of the invention provides that the connecting element contains magnetic metal. Preferably, the adjusting lever contains magnetic metal. Preferably, the connecting element and/or the adjusting lever are made of magnetic metal. The advantage hereby ensues that the connecting element can be heated inductively. Further features and their advantages of the first aspect of the invention may be taken from the descriptions of the second to fifth aspects of the invention.

A second aspect of the invention relates to a mounting tool for the rotation-resistant mounting of a predetermined guide vane with a predetermined adjusting lever of a guide vane adjustment of a turbomachine, with the adjusting lever forming a connecting element for connection to the guide vane. In accordance with the invention, the mounting tool comprises a heating device for heating the connecting element, with it being possible to position the heating device annularly around the connecting element.

A heating device can, in particular, be operated electrically. In particular, the heating device can convert electric energy to thermal energy. For example, the heating device comprises a heating resistor, with the heating device being designed for resistance heating. The mounting tool can preferably be operated by hand by an assembler and/or can be operated by a machine.

In particular, the heating device is ring-shaped, with it being possible for a ring opening of a ring shape to be open at the top side and bottom side or else solely at the bottom side. The ring opening can, in particular, be designed to be complementary to the connecting element, so that the connecting element can be positioned inside of the ring opening and, together with the connecting element, can create a clearance fit, for example. In this context, annularly positionable means that the annular heating device can accommodate the heating device inside of the ring opening. This has the advantage that it is possible in an especially effective manner to transfer thermal energy from the heating element to the connecting element.

A further development of the invention provides that the heating device has an induction coil. In particular, the induction coil is wound annularly around the ring opening of the heating device. This has the advantage that the heating element can be heated in an especially effective manner through the induction of electric current in the connecting element by the induction coil, whereby the electric current flows in the connecting element and thereby generates heat. A further advantage is that the heating device does not unnecessarily heat up itself, so that a safe handling of heating device is ensured.

The induction coil can be especially advantageous when the connecting element possesses ferromagnetic properties, for example, because it contains a magnetic material or is made of a magnetic material. Especially during a dismantling of the connecting element, it can be advantageous when the mounted connecting element has a higher magnetic conductivity than the outer end of the shaft, so that the connecting element can be heated more rapidly.

A further development of the invention provides that the mounting tool comprises a holding device for holding the adjusting lever. The holding device can hold the adjusting lever, in particular by gripping it or holding it magnetically or electromagnetically. Furthermore, the holding device can release the adjusting lever once again and detach itself from it. For example, the holding device comprises a gripper or an electromagnet.

The advantage hereby ensues that, by means of the mounting tool, it is possible to hold and to heat the adjusting lever, in particular the connecting element of the adjusting lever, so that no further tool or no manual holding is necessary. Accordingly, a mounting process for producing the connection can be simplified. Further features and their advantages of the second aspect of the invention may be taken from the descriptions of the first aspect of the invention as well as the third to fifth aspects of the invention.

A third aspect of the invention relates to a method for rotation-resistant mounting of a guide vane with an adjusting lever of a guide vane adjustment of a turbomachine by means of a mounting tool, comprising the steps:

- annular positioning of the heating device around the connecting element;
- heating of the connecting element by means of the heating device, so that an inner diameter of the connecting element widens;
- sleeve-like attachment of the connecting element on an outer end of a shaft of the guide vane, with the widened inner diameter of the connecting element being larger than a diameter of the shaft at the outer end;
- removal of the heating device from the connecting element, so that the connecting element cools down and shrinks onto the outer end of the shaft.

In particular, the connecting element together with the mounting tool, which is positioned annularly around the connecting element in a sleeve-like manner, can be attached on the outer end. During shrinkage, the inner diameter of the connecting element narrows onto the diameter of the shaft, so that an interference fit is created.

Preferably, the inner diameter, which is not widened by the heating, in particular the greatest tolerated size of the inner diameter, is smaller than the diameter of the shaft, in particular a minimum size of the diameter of the outer end of the shaft.

In particular, by way of the technical method, it is possible to shrink the connecting element onto the shaft, so that a force-fitting connection ensues. Hereby exploited is the property that substances, especially alloys, expand with increasing heat. In this method, the parts that are to be connected to each another are fabricated with an interference fit. The two parts cannot be connected to each other or can be connected only under the effect of a large force at normal temperature. However, if the outer part, the connecting element, is heated beforehand, thereby leading to its expansion, and subsequently rapidly drawn onto the surrounding element, the outer end of the shaft, it shrinks again during cooling and presses against the inner part and remains connected to it.

Preferably, the force-fitting connection between the connecting element and the shaft is supported by a form-fitting connection, at least in sections, between the connecting element and the outer end of the shaft.

The advantage of this method is that it can be carried out using few and especially simple steps. The mounting time per guide vane is thereby reduced, so that a mounting time for a plurality of guide vanes in a turbomachine is considerably reduced.

A further development of the invention provides that the outer end has a three-dimensional front surface with at least one beveled region, with the connecting element being attached on the outer end in a form-fitting manner.

By means of this form-fitting connection, it can be ensured advantageously that the adjusting lever is situated in an exactly defined position or at an exactly defined angle with respect to the guide vane, in particular with respect to the vane airfoil. Further features and their advantages of the third aspect of the invention may be taken from the descriptions of the first and second aspects of the invention as well as the fourth and fifth aspects of the invention.

A fourth aspect of the invention relates to a method for dismantling a rotation-resistant connection between a guide vane and an adjusting lever of a guide vane adjustment means of a turbomachine by means of a mounting tool according to one of claims 5 to 7, with the connecting element being shrunk in a sleeve-like manner onto an outer end of a shaft of the guide vane, comprising the steps:

- annular positioning of the heating device around the connecting element;
- heating of the connecting element by means of the heating device, so that an inner diameter of the connecting element widens;
- removal of the connecting element from the outer end of the shaft.

During the positioning, the adjusting lever can be held, in particular, by the holding device of the mounting tool. As a result of the widening, in particular, the force-fitting connection between the connecting element and the shaft is released. Subsequent to the method, the connecting element can be removed from the heating device, in particular by detaching the adjusting lever from the holding device.

The advantage of this dismantling method is that it can be carried out in especially simple manner. Further features and their advantages of the fourth aspect of the invention may be taken from the descriptions of the first to third aspects of the invention as well as the fifth aspect of the invention.

A fifth aspect of the invention relates to a turbomachine having a guide vane device according to one of the claims 1 to 4. Further features and their advantages of the fifth aspect of the invention may be taken from the descriptions of the first to fourth aspects of the invention.

BRIEF DESCRIPTION OF THE DRAWING FIGURES

Figure 2:
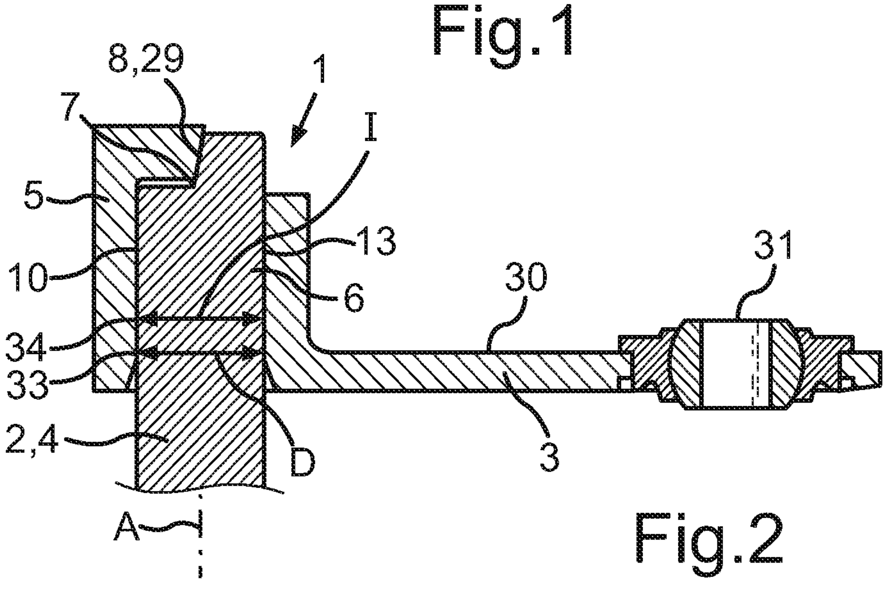
Figure 3:
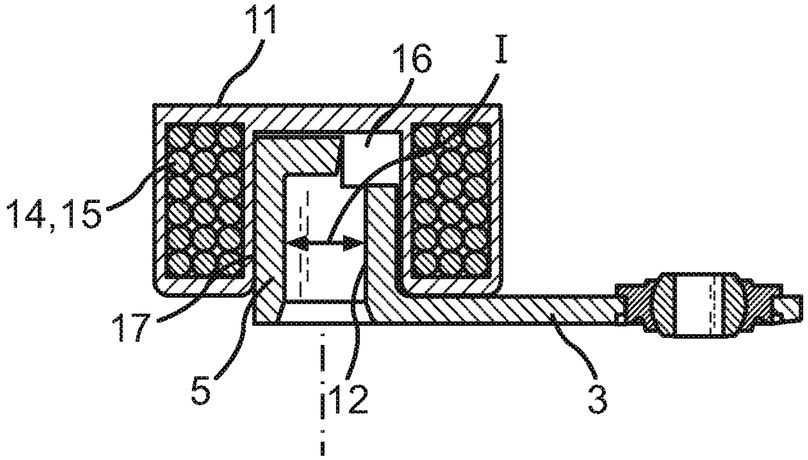
Figure 4:
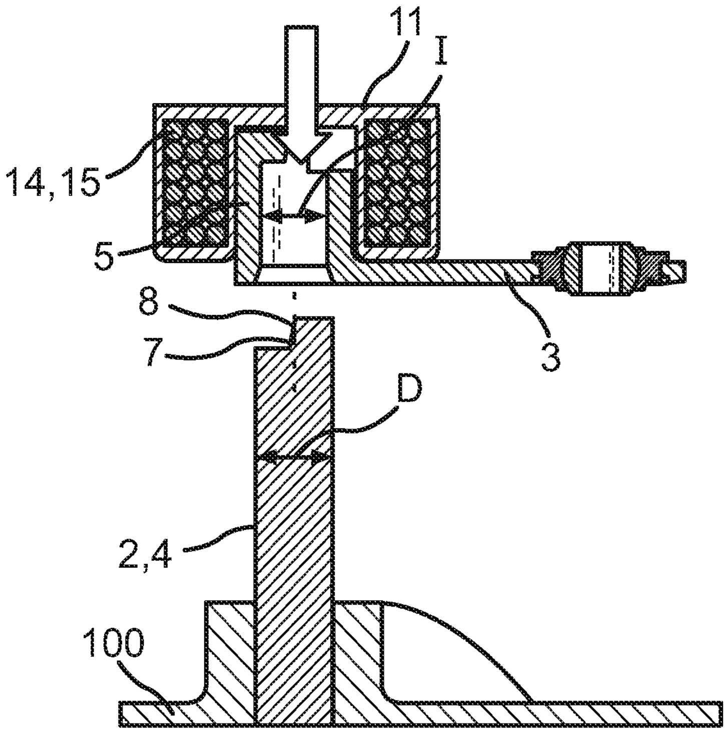
Figure 5:
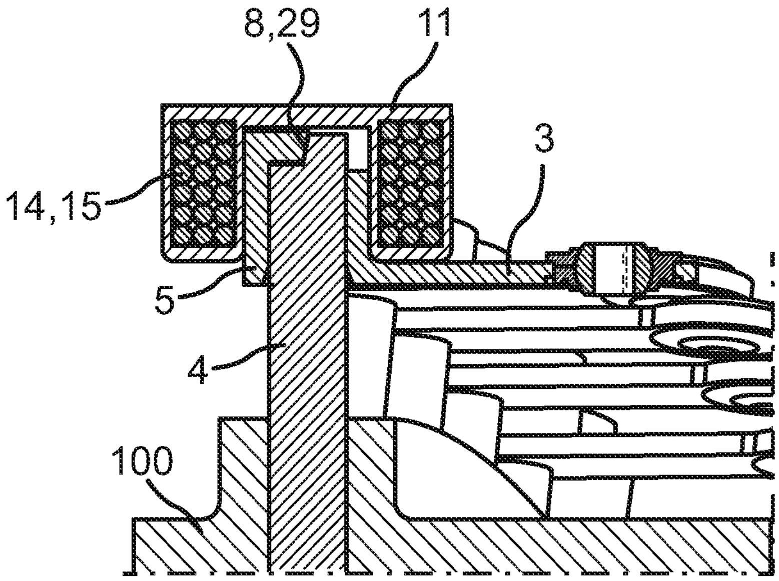
Figure 6:
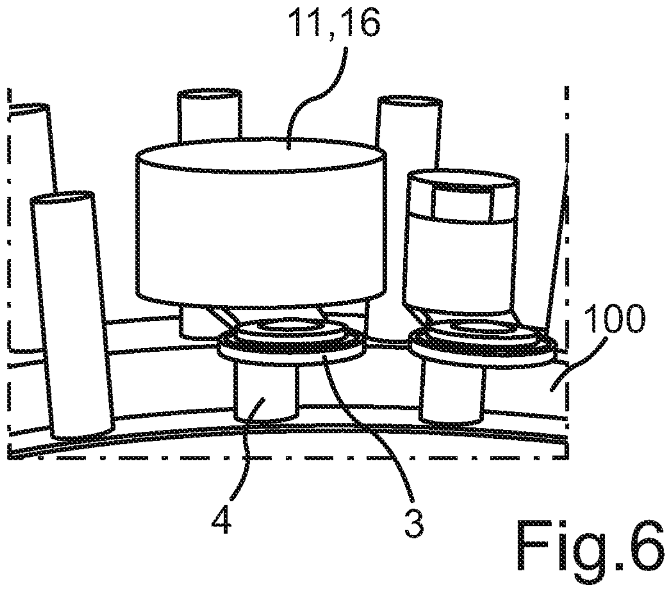
Figure 7:
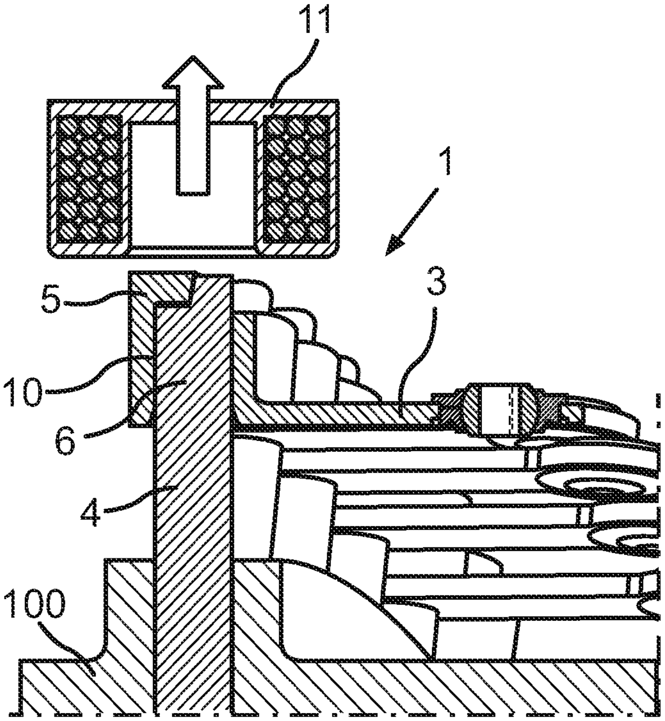
Figure 8:
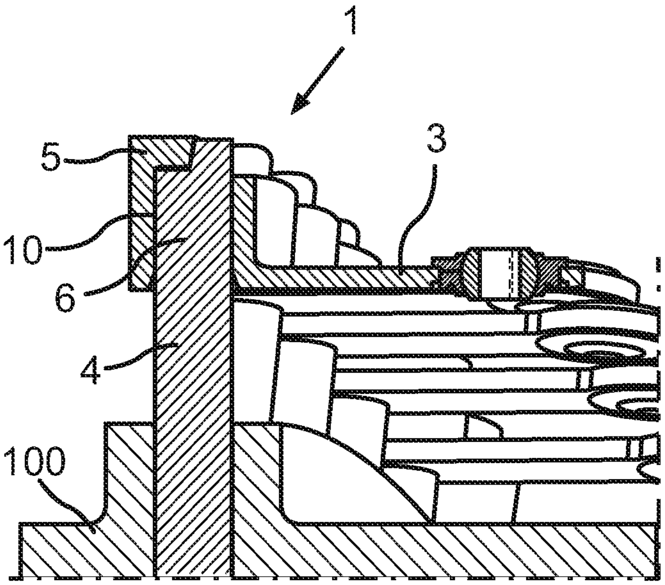
Figure 9:
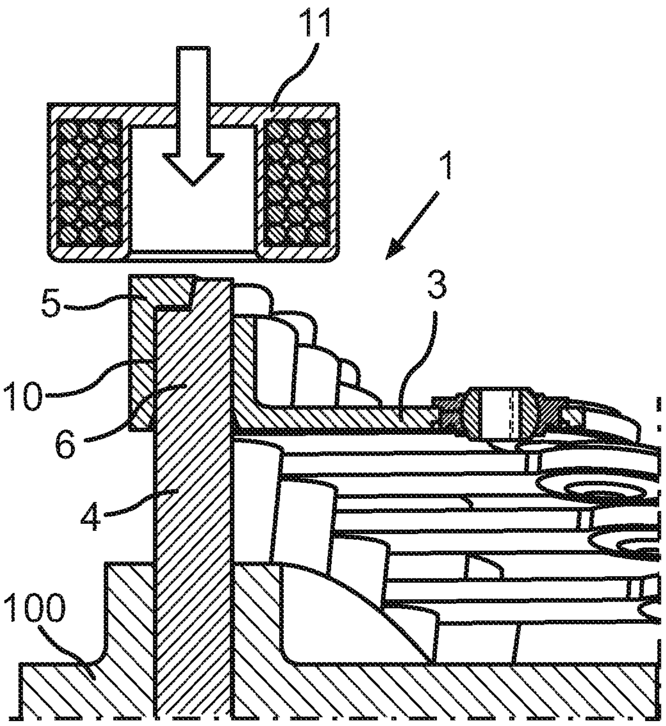
Figure 10:
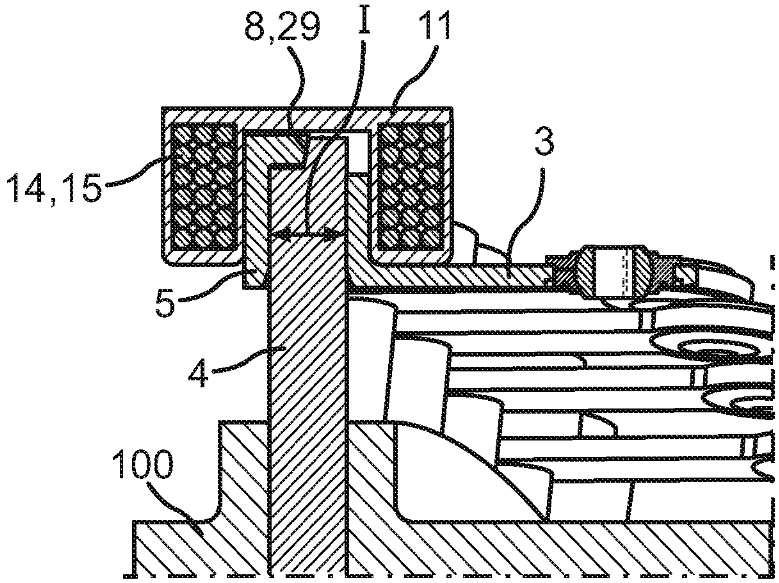
Figure 11:
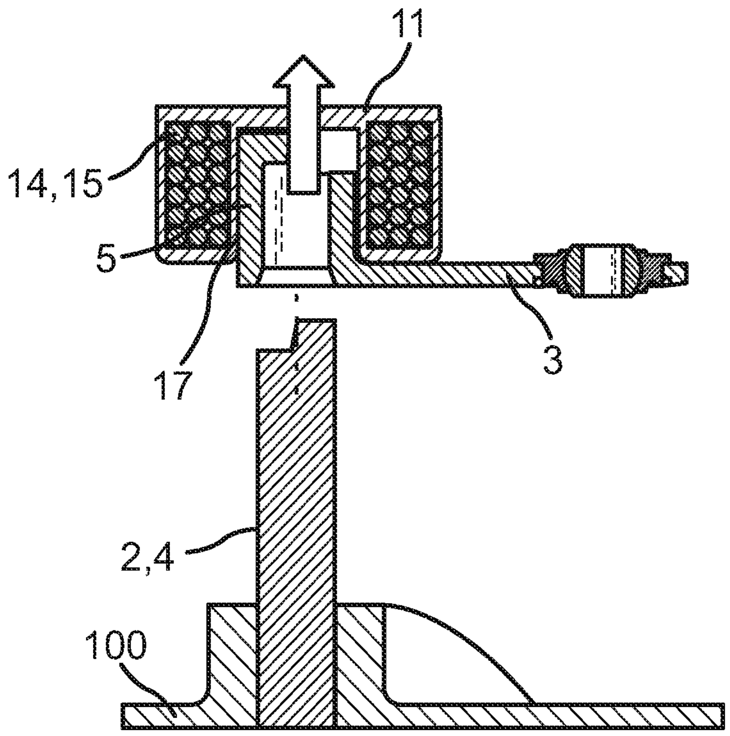
Figure 12:
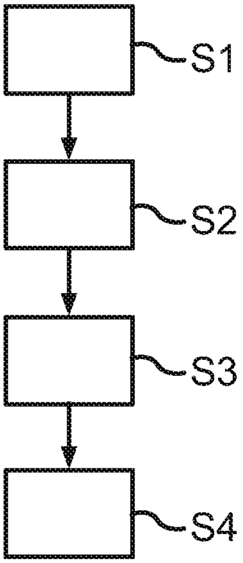
Figure 13:
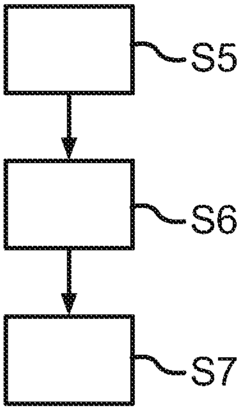

Further features of the invention ensue from the claims, the figures, and the figure descriptions. The features and combinations of features mentioned in the description as well the features and combinations of features mentioned below in the figure descriptions and/or shown solely in the figures can be used not only in the respectively specified combinations, but also in other combinations, without leaving the scope of the invention. Accordingly, embodiments of the invention that are not explicitly shown in the figures and explained, but ensue and can be produced by separate combinations of features from the explained embodiments, are also to be regarded as included in and disclosed by the invention. Also to be regarded as disclosed are embodiments and combinations of features that thus do not have all features of an independent claim as originally formulated. Beyond this, embodiments and combinations of features, in particular through the discussions presented above, that go beyond the combinations of features presented with reference back to the claims or that depart from them are also to be regarded as disclosed. Hereby shown are:

FIG. 1 a schematic illustration of a guide vane device;

FIG. 2 a sectional illustration of an outer end of a shaft of a guide vane;

FIG. 3 a sectional illustration of a mounting tool with an adjusting lever;

FIG. 4 a sectional illustration of a non-mounted adjusting lever;

FIG. 5 a sectional illustration of a connecting element attached on the shaft;

FIG. 6 a schematic illustration of a mounting tool on a turbomachine;

FIG. 7 a mounting tool removed from the connecting element;

FIG. 8 a schematic illustration of a mounted guide vane device of a guide vane adjustment means of a turbomachine;

FIG. 9 a sectional illustration of a non-positioned mounting tool;

FIG. 10 a sectional illustration of a positioned mounting tool;

FIG. 11 a sectional illustration of a dismantled adjusting lever;

FIG. 12 a schematic flowchart of a mounting method;

FIG. 13 a schematic flowchart of a dismantling method.

DESCRIPTION OF THE INVENTION

FIG. 1 shows, by way of example, a schematic illustration of a guide vane device 1 in a mounted state. The guide vane device 1 comprises a guide vane 2 and an adjusting lever 3. The guide vane 2 can be one piece in design and extends essentially along an adjustment axis A, which also represents the height axis of the guide vane. The guide vane 2 has a shaft 4. The vane airfoil 9 can be situated at a radial inner end of the shaft 4 of the guide vane 2. The adjusting lever 3 can be arranged at a radial outer end 6 of the shaft 4.

In the exemplary embodiment, the adjusting lever 3 can be one piece in design and can have a lever arm 30. At an end of the lever arm 30, it is possible to arrange a lever link 31 for connection to further components of a guide vane adjustment. At the other end of the lever arm 30 of the adjusting lever 3, it is possible to arrange a connecting element 5 of the adjusting lever 3, which can be designed as a hollow body 12.

The connecting element 5 surrounds at least in part the outer end 6 of the shaft 4 and, for example, can also rest with a beveled surface 29 against a beveled region 8 of a three-dimensional front surface 7 of the outer end 6.

In the example shown, a part of the outer end 6 is not surrounded by the connecting element 5, so that the outer end 6, in particular a part of a lateral surface 33 and a part of the three-dimensional front surface 7, are exposed. However, it may also be the case that the connecting element 5 completely surrounds the outer end.

Shown in FIG. 2 is a sectional illustration through the outer end 6 of the shaft 4 of the guide vane 2, with the cut extending through the shaft 4 in the middle. An inner wall surface 34 in the interior 13 of the connecting element 2 can adjoin, for example, a lateral surface 33 of the shaft 4 at the outer end 6 over its area, so that the connecting element 5 surrounds the outer end 6 in a sleeve-like manner. For example, the connecting element 5 and the shaft 4, in particular between the lateral surface 33 and the inner wall surface 34, form an interference fit 10. Furthermore, for example, a beveled surface 29 of the connecting element 5 rests against a complementary formed, beveled region 8 of the three-dimensional front surface 7 of the outer end 6.

In a mounted or shrunk-fitted state shown in FIG. 2, an inner diameter I of the connecting element 5 corresponds to the diameter D of the shaft 4 at the outer end 6. At least between the beveled region 8 of the shaft 4 and the beveled region 29 of the connecting element 5, it is possible in accordance with this exemplary embodiment to produce a form-fitting connection and, between the lateral surface 33 and the inner wall surface, it is possible to produce a force-fitting connection in the form of an interference fit 10.

FIG. 3 shows a sectional illustration of a mounting tool 11 with the adjusting lever 3. In this exemplary embodiment, the mounting tool 11, in particular a heating device 14, is positioned annularly around the connecting element 5. The heating device 14 can, for example, be designed as an induction coil 15.

The mounting tool 11 has, for example, a housing 16, in which the heating device 14 can be integrated. The housing 16 is, in particular, ring-shaped and, in turn, has a ring opening 17. The ring opening 17 is preferably designed to be complementary to the connecting element 5 and, for example, can accommodate the latter in the ring opening 17 with the creation of a form-fitting clearance fit.

Shown in FIG. 4 is a sectional illustration of a non-mounted adjusting lever 3. In particular, the connecting element 5 is heated by the heating device 14, which annularly surrounds the connecting element 5. This is depicted in FIG. 4 by the widened inner diameter I of the connecting element 5. In the widened state, the latter is at least slightly larger than the diameter D of the shaft 4 at the outer end 6.

The outer end 6 of the shaft protrudes from an opening of a turbomachine 100 and forms the three-dimensional front surface 7 with the at least one beveled region 8. The essentially vertically extending arrow symbolizes how the mounting tool 11 with the connecting element can be attached on the outer end 6. In particular, during the attachment, a form-fitting connection is produced between the shaft 4 and the adjusting lever 3.

FIG. 5 shows a sectional illustration of the attached connecting element 5 and of the mounting tool 11 on the shaft 4. In the heated state of the connecting element 5, in particular, it can be readily attached and can be joined to the outer end 6 in a form-fitting manner. As a result of the form-fitting connection between the beveled regions 8, 29, it is possible, in particular, to ensure a defined position of the adjusting lever 3 with respect to a geometry of the vane airfoil 9.

Shown in FIG. 6 is a schematic illustration of a mounting tool 11 on a turbomachine 100. The housing 16 or a part of the housing 16 can be, in particular, cylindrical in design and can be operated by hand or by a machine.

FIG. 7 shows a mounting tool 11 removed from the connecting element 5 in the direction symbolized by the arrow directed essentially vertically upward. By removal of the mounting tool 11 from the connecting element 5, the connecting element 5 can cool, so that the inner diameter I is reduced once again and the connecting element 5 is shrunk onto the shaft 4.

Shown in FIG. 8 is a schematic illustration of a mounted guide vane device 1 of a guide vane adjustment of a turbomachine 100. Shown, in particular, are a series of mounted guide vane devices 1 of a stage of the turbomachine.

FIG. 9 shows a schematic sectional illustration of a non-positioned mounting tool 11, which can be positioned in the arrow direction symbolized by the arrow directed essentially vertically downward or else can be positioned annularly around the mounted connecting element 5 of the connection device 1.

FIG. 10 shows a sectional illustration of the positioned mounting tool 11, with the heating device 14 being positioned annularly around the connecting element 5. As a result of the heating of the connecting element 5 by the heating device 14, the inner diameter I can be widened, so that the interference fit can be released.

Shown in FIG. 11 is a sectional illustration of a dismantled adjusting lever 3, which can be lifted from the shaft 4 in the arrow direction symbolized by the arrow directed vertically upward. During removal, the connecting element 5 can remain positioned in the ring opening 17, so that the mounting tool 11 and the connecting element 5 can be lifted jointly. In particular, it is hereby possible for the adjusting lever 3 to be held by a holding device of the mounting tool 11.

FIG. 12 shows a schematic flowchart of a mounting method, in particular, of a method for rotation-resistant mounting of the guide vane 2 with the adjusting lever 3 by means of a mounting tool 11 in accordance with a preferred embodiment. In a first step S1, the heating device 14 can be positioned annularly around the connecting element 5. In a second step, the connecting element 5 can be heated by means of the heating device 14, so that the inner diameter I of the connecting element 5 widens. In a third method step S3, the connecting element 5 is attached on the outer end 6 of the shaft 4 of the guide vane in a sleeve-like manner, with the widened inner diameter I of the connecting element 5 being larger than a diameter D of the shaft 4 at the outer end 6. In a fourth step S4, the heating device 14 is removed from the connecting element, so that the connecting element 5 cools down and shrinks onto the outer end 6 of the shaft 4.

Shown in FIG. 13 is a schematic flowchart of a dismantling method, in particular a method for dismantling a rotation-resistant connection between the guide vane 2 and the adjusting lever 3 by means of the mounting tool 11. In a fifth step S5, the heating device 14 is positioned annularly around the connecting element 5. In a sixth step S6, the connecting element 5 is heated by means of the heating device 14, so that the inner diameter I of the connecting element 5 widens. In a seventh step S7, the connecting element 5 can be lifted from the outer end 6 of the shaft 4.

What is claimed is:

1. A guide vane device and mounting tool for a guide vane adjustment of a turbomachine, comprising a guide vane, which has a shaft extending along an adjustment axis of the guide vane, an adjusting lever, which forms a connecting element for connection to a connecting section at the radial outer end of the shaft, wherein the shaft has a positioning segment, the connecting element surrounds, at least in sections, the connecting section at the outer end of the shaft in a sleeve-like manner and is joined to the positioning segment in form-fitting manner, a mounting tool configured for rotation-resistant mounting of a guide vane, the mounting tool including a heating device, configured as an induction coil, configured and arranged to heat the connecting element, with the heating device annularly positioned around the connecting element, the guide vane device forms an interference fit between the connecting element and the connecting section at the outer end of the shaft.

2. The guide vane device and mounting tool according to claim 1, wherein the connecting element is a hollow body, which, in its interior, is configured and arranged to be complementary to the outer end of the shaft.

3. The guide vane device and mounting tool according to claim 1, wherein, in a non-mounted state, an inner diameter of the connecting element is smaller than a diameter of the shaft at the outer end.

4. The guide vane device and mounting tool according to claim 1, wherein the positioning segment is configured and arranged as a three-dimensional front surface with at least one beveled front surface.

5. A turbomachine comprising a guide vane device according to claim 1.

6. The guide vane device and mounting tool according to claim 1, wherein the mounting tool comprises a holding device for holding the adjusting level.

7. A method for rotation-resistant mounting of a guide vane, comprising the steps of:

providing the guide vane device and mounting tool of claim 1 annular positioning of the heating device around the connecting element;

heating the connecting element by the heating device, so that an inner diameter of the connecting element widens;

sleeve-like attachment of the connecting element onto an outer end of a shaft of the guide vane, with the widened inner diameter of the connecting element being larger than a diameter of the shaft at the outer end;

removal of the heating device from the connecting element, so that the connecting element cools and shrinks onto the outer end of the shaft.

8. The method according to claim 7, wherein the outer end has a three-dimensional front surface with at least one beveled region, with the connecting element being attached in a form-fitting manner on the outer end.

9. A method for dismantling a rotation-resistant connection a guide vane comprising the steps of:

providing a guide vane device and mounting tool of claim 1, wherein the connecting element is being shrunk in a sleeve-like manner onto an outer end of a shaft of the guide vane;

annular positioning of the heating device around the connecting element;

heating of the connecting element by the heating device, so that an inner diameter of the connecting element widens;

removing the connecting element from the outer end of the shaft.

* * * * *